May 16, 1950  B. B. WRIGHT  2,507,844
MOTORBOAT STEERING AND PROPULSION MECHANISM
Filed May 3, 1946  6 Sheets-Sheet 2
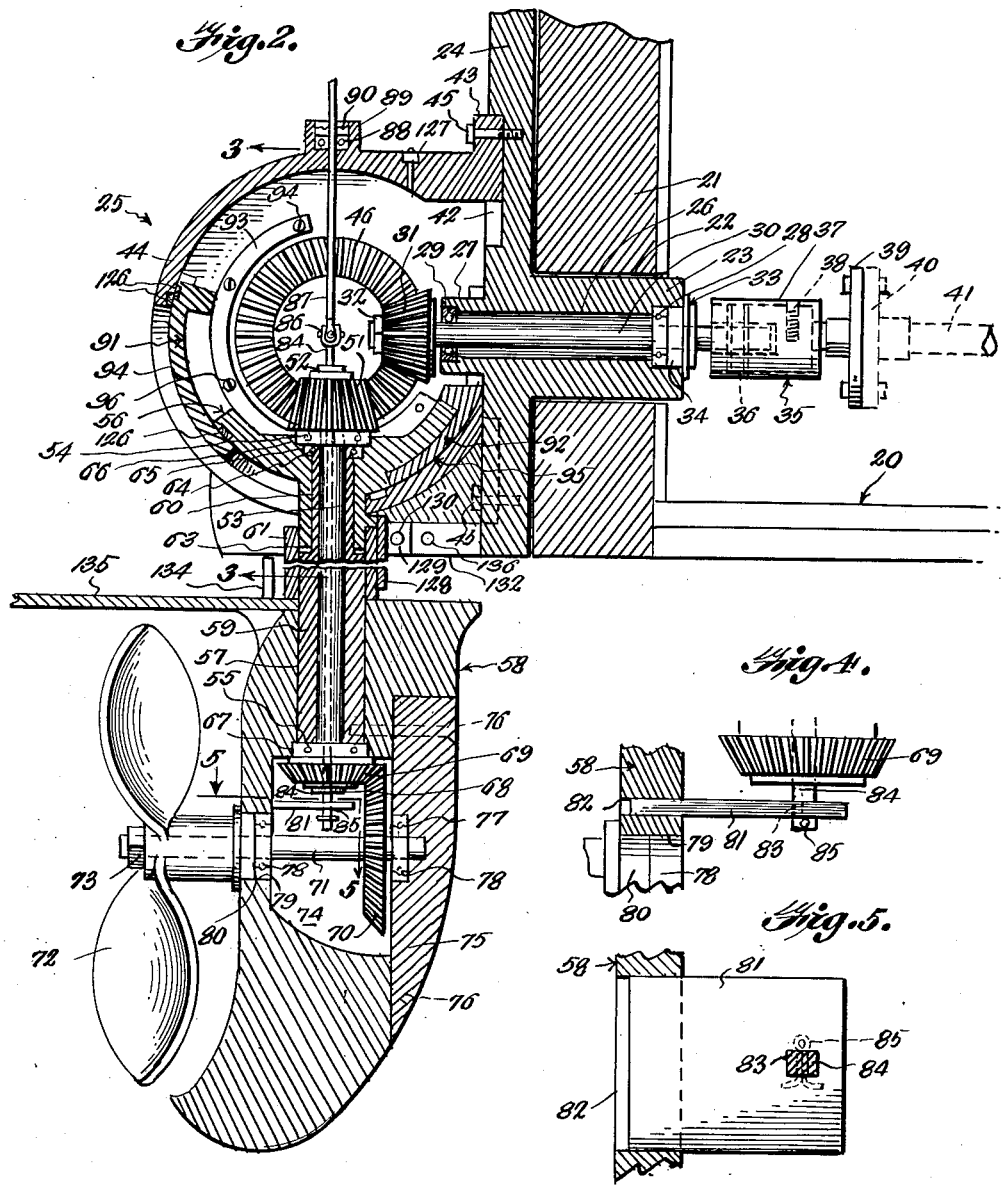
Inventor
BEAUMONT B. WRIGHT
By Randolph & Beavers
Attorneys May 16, 1950 B. B. WRIGHT 2,507,844
MOTORBOAT STEERING AND PROPULSION MECHANISM
Filed May 3, 1946 6 Sheets-Sheet 3

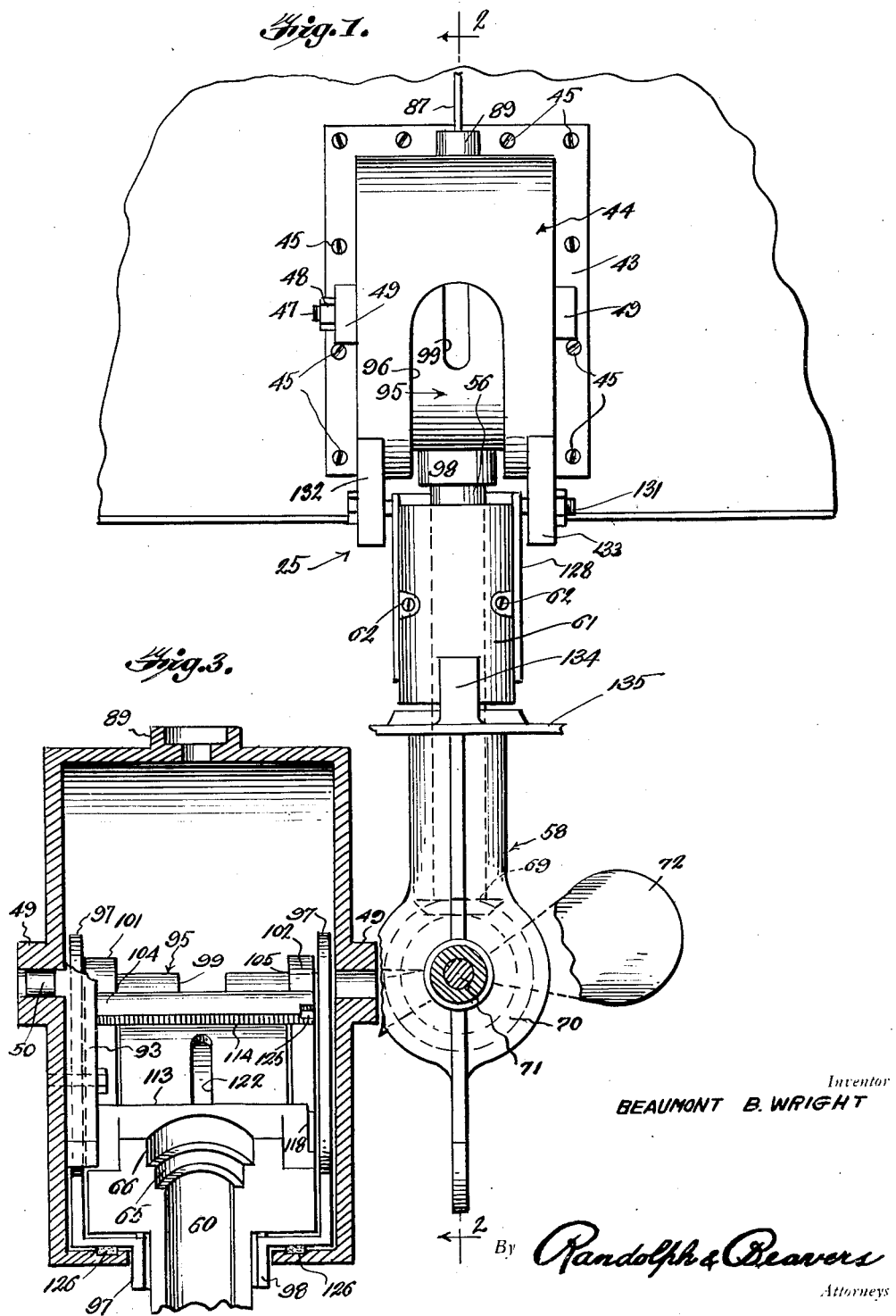

Inventor
BEAUMONT B. WRIGHT

By Randolph & Beavers
Attorneys

May 16, 1950   B. B. WRIGHT   2,507,844
MOTORBOAT STEERING AND PROPULSION MECHANISM
Filed May 3, 1946   6 Sheets-Sheet 4

Inventor
BEAUMONT B. WRIGHT

By Randolph & Beavers
Attorneys

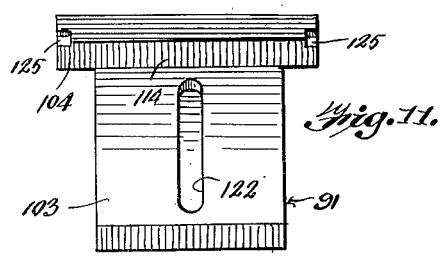
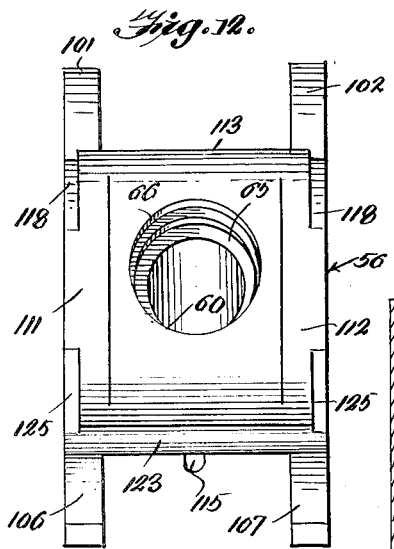
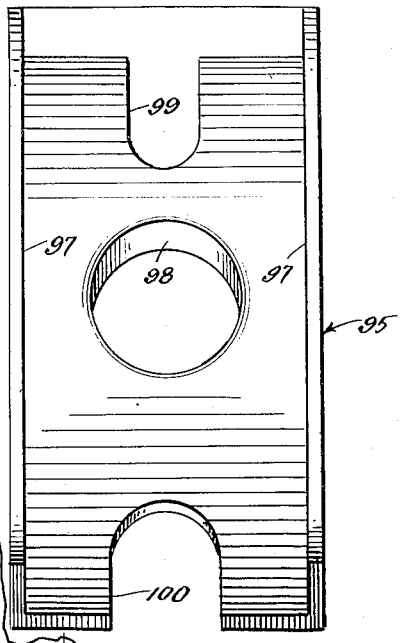
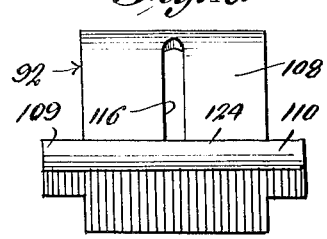
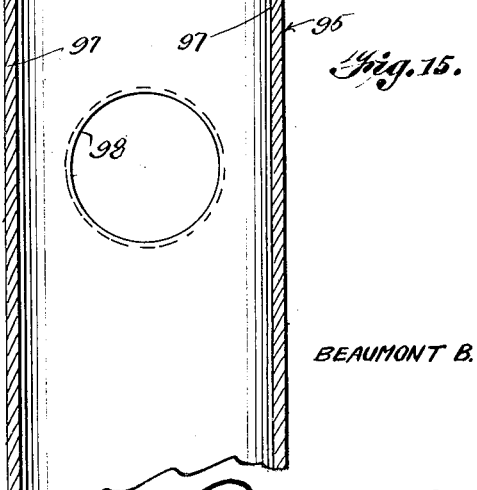

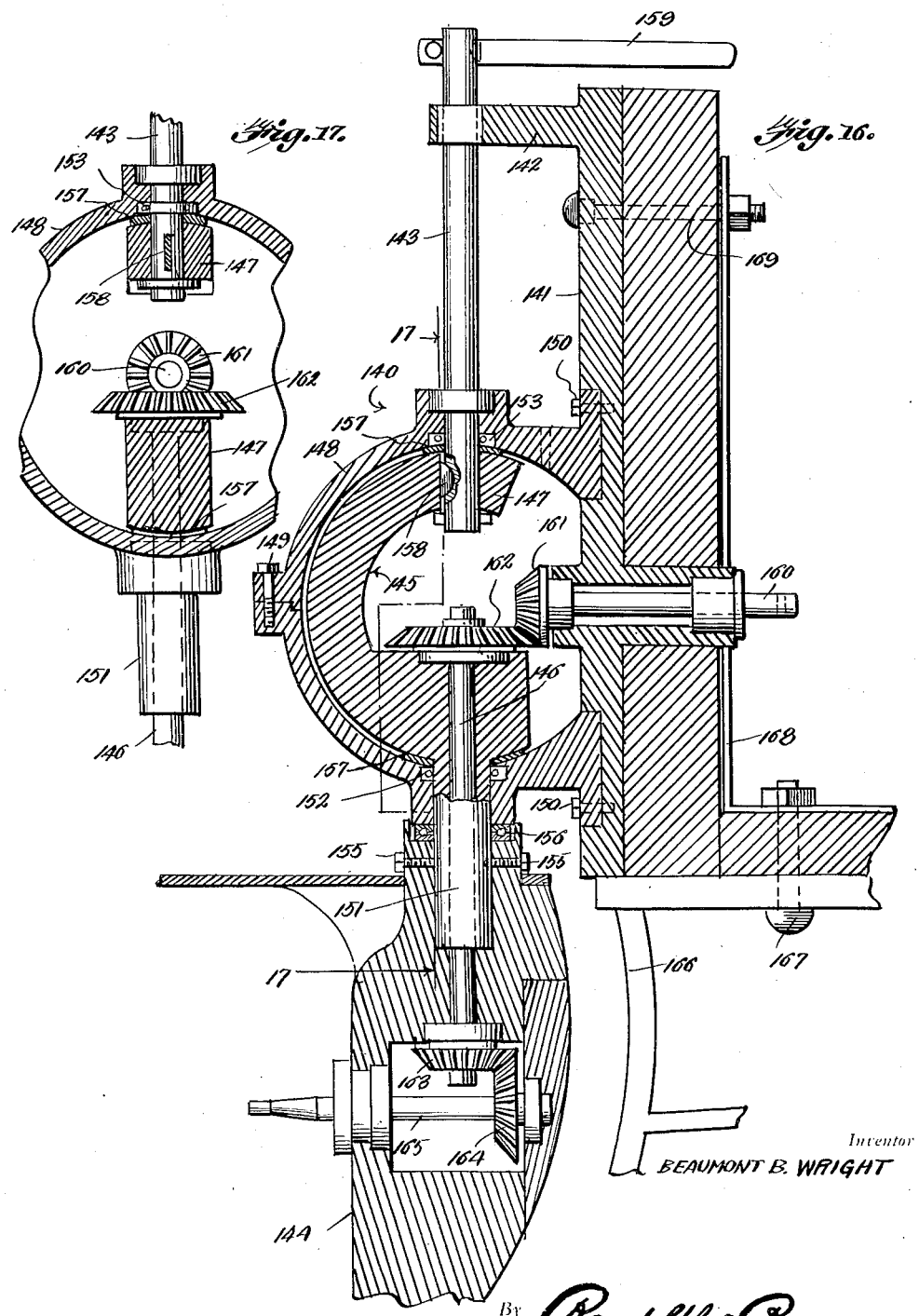

Patented May 16, 1950

2,507,844

UNITED STATES PATENT OFFICE 2,507,844

MOTORBOAT STEERING AND PROPULSION MECHANISM

Beaumont B. Wright, Wink, Tex.

Application May 3, 1946, Serial No. 666,872

6 Claims. (Cl. 115—41)

This invention relates generally to steering and propulsion mechanism for motor boats and more particularly to a new and improved outboard propeller drive assembly adapted to be attached to the stern of a small boat and to transmit power to the propeller from an inboard motor, all in a manner to effect an optimum arrangement susceptible of maximum power displacement and extreme ease of control over the steering movements of the boat. Morever, the present invention, according to one of the embodiments thereof, contemplates an arrangement for the propeller drive assembly which provides for rearward and upward tilting movement thereof when the boat passes over any obstruction in the water that is hit by the propeller assembly; the propeller assembly at the same time providing for continuous delivery of power to the propeller and continuous control over the steering movements thereof.

An important object of the present invention, therefore, is to provide an outboard propeller drive assembly adapted to tilt in a manner to avoid obstructions in the water while maintaining continuous control over the power delivery and steering operations of the propeller.

Another object is to provide an outboard propeller drive assembly which also forms a substantially watertight casing and bearing support for the driving and steering connections to the propeller while at the same time permitting steering and tilting movements of the propeller assembly.

A further object is to provide an outboard propeller drive assembly having a steering mechanism which is effectively disposed substantially entirely along the steering axis of the propeller assembly, thereby to facilitate the steering movements thereof.

An additional object resides in the provision of a self-locking arrangement for a tilting propeller drive assembly which prevents tilting movement thereof when the assembly is turned 180 degrees about its steering axis to drive the boat in reverse.

Still another object is to provide a simple shear pin arrangement, accessible for replacement within the boat, for breaking the driving connections to the propeller when the same strikes an obstruction in a manner to cause shearing of the pin.

Yet another object is to provide a unitary and completely enclosed outboard propeller drive assembly which is capable of wide angle tilting and 360 degree turning movements without losing control over either the power transmission to the propeller or the steering control thereof, and which, in addition, possesses all of the desired qualities of ease and economy of manufacture, dependability and reliability in service, efficiency and ease of operation, and ready replacement and repair of parts in case of wear.

Still other objects, features and advantages of the present invention not specifically set forth hereinbefore are those inherent in or implied from the novel construction, combination and arrangement of parts as will become more fully apparent as the description proceeds, reference being had to the accompanying drawings wherein:

Figure 1 is a rear elevational view of the propeller drive assembly according to the preferred embodiment of the invention, the assembly as illustrated, being attached to the stern of a boat suitable for use therewith;

Figure 2 is a sectional view taken along the line 2—2 of Figure 1;

Figure 3 is a sectional view of the casing as seen substantially along the line 3—3 of Figure 2;

Figure 4 is a somewhat enlarged view in elevation of the lower end of the steering mechanism as seen in Figure 2;

Figure 5 is a sectional view taken along the line 5—5 of Figure 2;

Figures 11, 12, 13 and 14 are perspective views respectively of the several elements comprising the expansible yoke;

Figure 15 is a developed plan view of the yoke bearing race or cover;

Figure 16 is a sectional view of a propeller drive assembly according to an alternate embodiment of the invention in which no provision is made for tilting the assembly, and Figure 17 is a fragmentary sectional view as seen along the line 17—17 of Figure 16.

Figure 6:
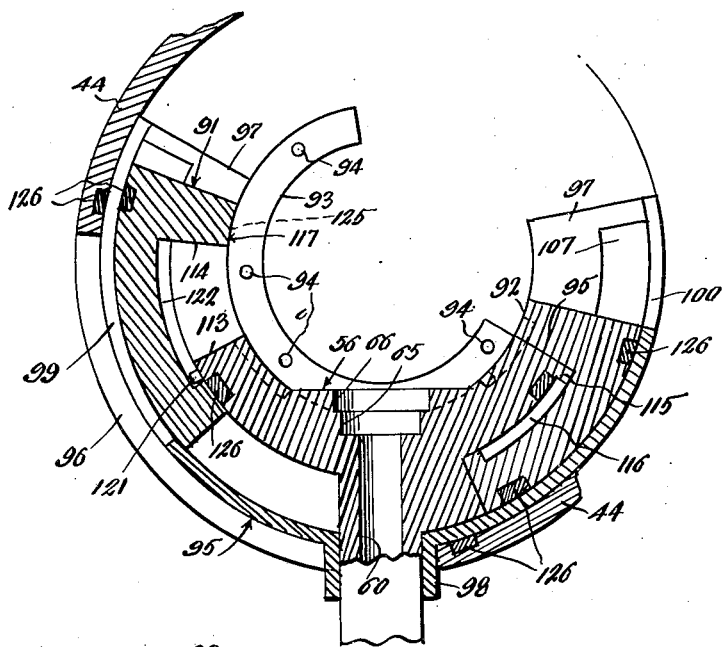
Figure 6 is a somewhat enlarged fragmentary sectional view of the expansible yoke taken substantially through the center thereof.
Figure 7:
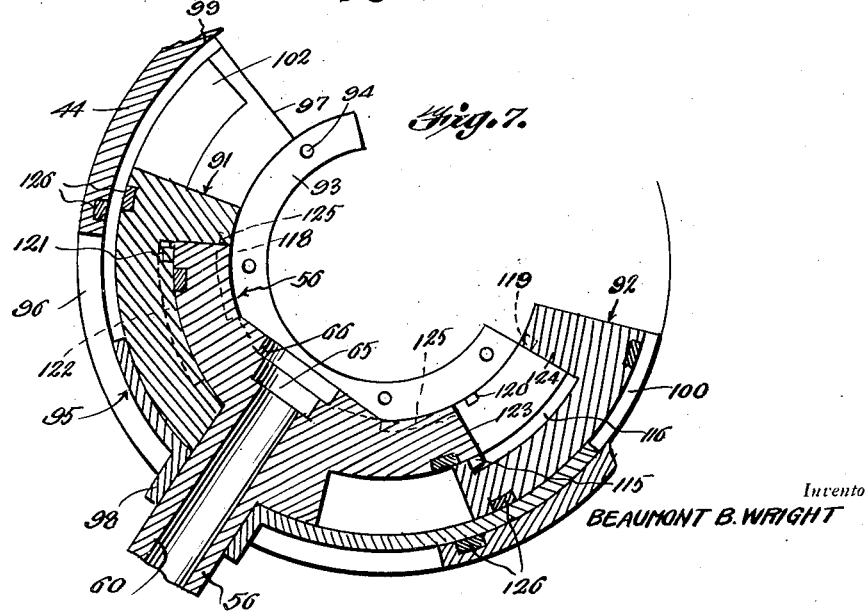
Figure 7 is a view similar to Figure 6 but illustrating the yoke as seen when tilted through approximately one-half its complete angle of tilt.
Figure 8:
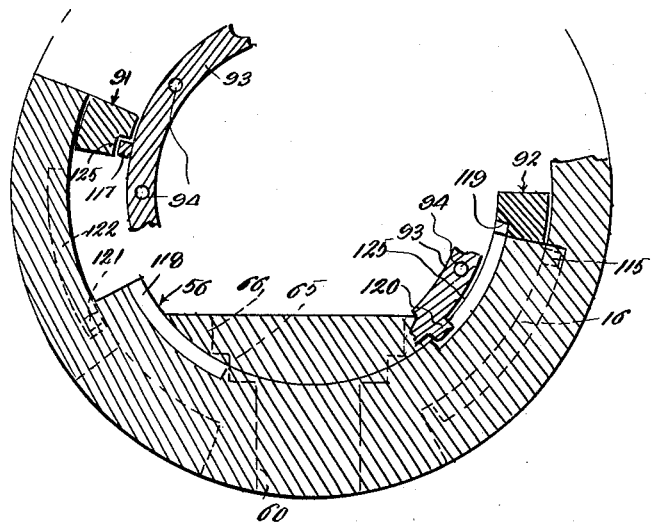
Figure 8 is a sectional view similar to Figure 6 but taken along somewhat different lines through the yoke so as to illustrate more clearly the function of the retaining ring.
Figure 9:
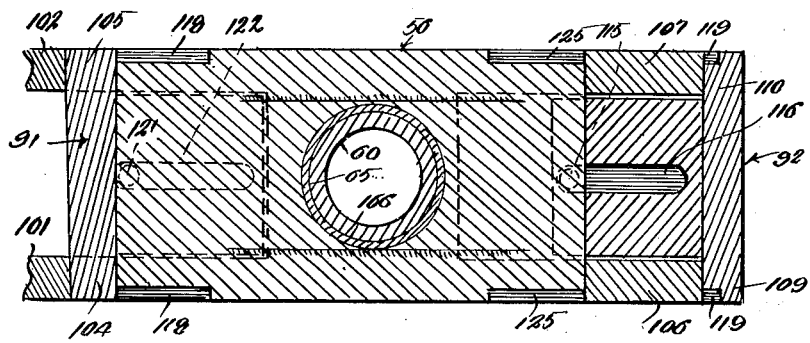
Figure 9 is a developed plan view as viewed from the inside of the yoke as seen in Figure 8.
Figure 10:
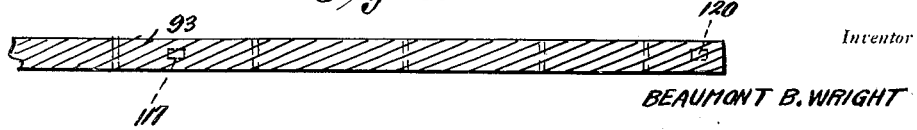
Figure 10 is a developed plan view of the retaining ring as viewed from the inside of Figure 8.

Referring now to the drawings for a more complete understanding of the invention and more particularly to Figures 1 through 15, the numeral 20 generally designates a boat, the transom 21 of which is provided with an aperture 22 through which projects a hub portion 23 of a supporting plate 24 for the outboard propeller drive assembly generally designated 25. The supporting plate is secured to the transom in any suitable manner, not shown, adapted to provide a watertight relation therebetween.

The hub portion 23 of plate 24 has a bore 26 extending therethrough and terminates on the opposite side of the plate in a somewhat smaller hub portion 27, the hub portions being counterbored to receive bearings 28 and 29, respectively which serve to support a shaft 30 for rotation therein. A bevel gear 31 is secured as by a nut 32, to one end of shaft 30, the other end being secured against axial movement in bore 26 as by a nut and washer generally designated 33, a shaft and housing seal 34 preferably being interposed between bearing 28 and the washer.

Shaft 30 is coupled to a short shaft assembly generally designated 35 by means of the shear pin 36 which is retained in power transmitting relation therebetween by means of the sleeve 37, the sleeve being releasably retained in position by the ball and spring arrangement 38. Shaft assembly 35 carries a flange 39 for connection with a similar flange 40 which in turn may be secured to a power shaft 41 in power transmitting relation to the motor or engine, not shown. Whereas shafts 30 and 41 are shown to be generally horizontal, it will be understood that variations from this condition readily may be met with merely by inserting universal or flexible connections at one or more desired points along the drive.

Supporting plate 24 is undercut as at 42 to receive the rectangular flange portion 43 of substantially cylindrical housing or casing 44 which is secured to the plate in sealed relation therewith as by the cup screws 45. Casing 44 is mounted on plate 24 so that the axis thereof intersects the axis of shaft 30 such that the bevel gear 46, which is concentric with the axis of the casing, mates properly with bevel gear 31. Gear 46 is mounted for rotation about a stub shaft 47 which is secured as by a nut 48, to one side of the casing in an apertured boss portion 49 thereof, a similar arrangement being provided on the opposite side of the casing to accommodate a pair of gears 46, when desired, the aperture otherwise being sealed with a plug 50.

Gear 46 drives a third bevel gear 51 which is secured as by a nut 52 to a hollow shaft 53 which is supported in bearings 54 and 55 mounted respectively, in member 56 of the expansible yoke, hereinafter more fully to be described, and in a bore 57 in the foot assembly 58. Shaft 53 extends through a tubular member 59 which is inserted in bore 57 in foot 58 and secured thereto whereby the two move together about the axis of shaft 53. The upper portion of member 59 is reduced in diameter so as to be received telescopically within a bore 60 in member 56 of the expansible yoke, the portion of member 56 surrounding the lower end of bore 60 being cylindrical and of the same diameter as the enlarged portion of tubular member 59 whereby a collar or sleeve 61, formed in two halves and bolted together as at 62, is received in telescoping relation with these members. Thereby to strengthen the unitary structure formed in their combination while permitting relative rotation therebetween about their common axis, a thrust washer 63 preferably being interposed between these members to further facilitate movement between them.

Member 59 is retained in fixed axial relation to member 56 by means of a retaining ring 64 which is seated in counterbore 65 adjacent bearing 54 which is seated in a larger counterbore 66 in member 56. Bearing 55 at the other end of shaft 53 is seated in a counterbore 67 in foot 58. This end of the shaft has secured thereto, as by a nut and lock washer 68, a bevel gear 69 which meshes with a bevel gear 70 suitably secured for rotation with the propeller shaft 71 to which is secured a conventional propeller 72 as by a nut 73. Gears 69 and 70 occupy a chamber 74 to which access is made by way of removable plate 75 secured to foot 58 as by screws 76. Plate 75 carries one bearing 77 for shaft 71, the other bearing 78 therefore being carried in a bore 79 in the foot together with a suitable seal 80.

A plate 81, secured to foot 58 as by being formed integrally therewith or by being pressed into an aperture 82 therein, extends into chamber 74 generally parallel to shaft 71 and is provided with a square aperture 83 through which the square end of a shaft 84 passes, shaft 84 being extended through the central opening in tubular shaft 53 and provided with a cotter key 85 on its lower end and a universal joint 86 on its upper end. Joint 86 makes connection with a shaft 87 at the point of intersection of the axes of bevel gears 31, 46 and 51 whereby rotation of shaft 84 to effect turning movement of foot 58 through plate 81 about the axis of shaft 53 notwithstanding tilting movement of the foot and yoke assembly about the axis of casing 44. The driving connections to the propeller, of course, also are not broken by reason of the tilting movement for the reason that gear 51 maintains its mating relation with gear 46 during such movement.

Shaft 87 preferably is journaled in a bearing 88 seated in a bossed portion 89 of the casing, a seal 90 also being provided therein adjacent the bearing. Any form of steering arrangement may be used to drive shaft 87, this being accomplished directly by means of a steering arm secured thereto, or remotely therefrom, as by a system of chains or ropes and pulleys acting thereon.

The expansible yoke, by means of which the foot assembly 58 is mounted for pivotal movement about the axis of casing 44, comprises a plurality of arcuate members 56, 91 and 92 which are formed concentrically with the casing and adapted for sliding movement therein about the inner cylindrical wall thereof, being held in such position by a pair of circular retaining rings 93 secured to the sides of the casing as by cup screws 94. Members 56, 91 and 92 do not make direct contact with the casing, a race 95 formed of a suitable bearing material such, for example, as copper is interposed therebetween and thus serves to take up any wear due to the tilting movement. Race 95 also serves as a cover to seal the open portion 96 of the casing which is necessary in order to permit the cylindrical portion of member 56 to move relative to the casing. Race 95 has side wall portions 97 which extend to the arcuate sides of retaining rings 93 and a sleeve portion 98 which fits closely about the cylindrical portion of member 56. A slot 99 is formed in one end of the race to clear shaft 87 when the yoke is tilted upward to its extreme position and a slot 100 is formed in the other end to clear the hub portion 27 on supporting plate 24.

Member 56 is generally H-shaped having legs 101 and 102 between which the tongue portion 103 of member 91 is adapted to move and upon which the end portions 104 and 105 of member 91 are adapted to slide, the inner sides of end portions 104 and 105 sliding along retaining rings 93. The other legs 106 and 107 of member 56 similarly receive the tongue portion 108 of member 92 therebetween; member 92 also has end portions 109 and 110 which slide along legs 106 and 107, respectively of member 56 and on the inner sides thereof slide along retaining rings 93. Surfaces 111 and 112 of member 56 also are supported by the retaining rings.

Thus, members 56, 91 and 92 interfit to form unit which in turn interfits with race 95 and is expansible therein, the entire unit including the race being slidably movable between the rings 93 and the inner cylindrical wall of casing 44. Thus, as member 56 is tilted clockwise, as viewed in Figures 6 through 8, member 56 and race 95 move together with respect to members 91 and 92 until surface 113 on member 56 engages surface 114 on member 92 and lug 115 on member 56, which lug travels in slot 116 on member 92, reaches the end of the slot whereupon members 56, 91 and 92 and race 95 move together as a unit until lugs 117 on retaining rings 93 reach the end of slots 118 formed in member 56 and slots 119 in member 92 move onto lugs 120 on the rings. As member 56 is moved counterclockwise, it again moves with respect to members 91 and 92 until lug 121 in member 56, which lug travels in a slot 122 on member 91, reaches the end of the slot and surface 123 on member 56 engages surface 124 on member 92 whereupon all the members of the yoke together with the race travel as a unit back to their positions as seen in Figure 6, these positions being reached as slots 125 in member 91 engage lugs 117 on the retaining rings and the ends of slots 125 on member 56 engage lugs 120 on the rings.

By reason of the foregoing arrangement of the expansible yoke, a wide angle of tilt approximately 90 degrees is obtained while at the same time providing a large bearing surface for sliding movement, thereby avoiding any tendency of the parts to bind. Moreover, the expansible yoke insures at all times a cover for the open portion 96 of casing 44, thereby to provide an enclosed housing at all times. Seals 126 between the race 95 and the housing and between the race and the several parts of the yoke may be employed, when desired, to further insure a watertight casing and also to retain lubricant therein, this being supplied by way of the single fitting as at 127.

In the event that an inclined transom is encountered in some cases, the load support 128, which is in the form of a half portion of a tubular member adapted to receive the collar 61, is provided with a lug 129 having a transverse opening 130 through which a bolt 131 may pass, the bolt also passing through a selected one of a plurality of pairs of openings 136 in spaced members 132 and 133 depended from supporting plate 24 whereby the foot assembly 58 may initially be placed at any desired angle notwithstanding the angle of inclination of the transom from vertical.

In order to lock the drive assembly 25 against tilting movement when the foot assembly is rotated 180 degrees in either direction to move the boat 20 in reverse, lug 134 is provided on the planing board 135. Thus, the lug assumes a position ahead of support member 128 when the drive assembly is turned through 180 degrees and causes the lug to move into stopped engagement with member 128 as the tongue load is developed by the propeller.

From the foregoing detailed description of the several parts and their manner of operation, the operation of the outboard drive assembly 25 should now be apparent.

Referring now to Figures 16 and 17 wherein a stationary outboard propeller drive assembly generally designated 140 is disclosed, it will be seen that this drive assembly is generally similar as regards the use of seals and other features specific to the driving connections, to the tilting assembly 25, but is preferably of heavier construction and adaptable for use on heavier boats. Supporting plate 141 in this case is provided with an arm 142 in which the steering shaft 143 is additionally journaled, and the steering shaft makes a non-pivotal connection with the foot assembly 144 through a member 145 which rotatively supports the vertical drive shaft 146. To this end, member 145 has a substantially C-shaped portion 147 concentrically disposed within a generally spherically-shaped housing 148 formed in two halves adapted to be bolted together as at 149 and to the supporting plate 141 as at 150. Thus, the cylindrical portion 151 of member 145 is adapted to be journaled as at 152 and the C-portion 147 journaled as at 153 in the housing 148. Portion 151 is secured to the foot assembly 144 within bore 154 therein as by screws 155, a thrust bearing 156 being interposed between the casing and the foot assembly and thrust washer 157 being interposed between the casing and C-portion 147.

The steering shaft 143 may be keyed as at 158 to C-portion 147. Thus, turning movements applied to shaft 143, as by handle 159, are applied to the foot assembly 144 along a line coinciding with the turning axis of the drive assembly.

Power is applied to the propeller from the inboard motor by way of horizontal shaft 160 bevel gears 161 and 162, shaft 146, and thence through bevel gears 163 and 164 to the propeller shaft 165, the axis of turning movement of the foot assembly thus coinciding with the axis of the vertical power transmitting shaft 146.

A pin 166 is provided to protect the foot from damage by reason of any obstruction encountered in the water, this pin being a solid plate, when desired, to stabilize the boat on fast turns. The pin is anchored to the boat as at 167, a reinforcing plate 168 being provided on the inner side of the boat to strengthen the bottom and transom, plate 141 being secured to plate 168 by one or more bolts 169.

From the foregoing it should now be apparent that an outboard propeller drive assembly has been provided which is well adapted to fulfill the aforestated objects of the invention. Moreover, while the invention has been described in particularity with respect to two examples thereof which give satisfactory results, it will be apparent to those skilled in the art to which the invention relates or more nearly appertains, that the same is susceptible of additional embodiments and changes without departing from the spirit and scope of the invention as defined by the appended claims.

What I claim as my invention is:

1. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow driving shaft disposed coaxially with said steering axis for providing driving connections between the propeller shaft and the motor in the boat, and means including a first steering shaft extended through said hollow shaft and a second steering shaft universally connected to said first steering shaft at the intersection of said steering and tilting axes for providing control over the steering movement of said foot assembly from a steering control point within the boat.

2. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow drive shaft disposed coaxially with said steering axis and a second drive shaft so disposed as to have its axis pass through the intersection of said steering and tilting axes for providing driving connections between the propeller shaft and the motor in the boat, and means including a first steering shaft extended through said hollow shaft and a second steering shaft universally connected to said first steering shaft at the intersection of said steering and tilting axes for providing control over the steering movement of said foot assembly from a steering control point within the boat.

3. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow drive shaft disposed coaxially with said steering axis and a second drive shaft so disposed as to have its axis pass through the intersection of said steering and tilting axes for providing driving connections between the propeller shaft and the motor in the boat, means including said mounting means for providing a substantially watertight housing for said driving connections, and means including a first steering shaft extended through said hollow shaft and a second steering shaft universally connected to said first steering shaft at the intersection of said steering and tilting axes for providing control over the steering movement of said foot assembly from a steering control point within the boat.

4. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow drive shaft disposed coaxially with said steering axis and a second drive shaft so disposed as to have its axis pass through the intersection of said steering and tilting axes for providing driving connections between the propeller shaft and the motor in the boat, means including said mounting means for providing a substantially watertight housing for said driving connections, said driving connections comprising three intermeshing bevel gears secured to said hollow shaft and said second drive shaft and mounted on said housing for rotation about said steering axis respectively, and means including a first steering shaft extended through said hollow shaft and a second steering shaft universally connected to said first steering shaft at the intersection of said steering and tilting axes for providing control over the steering movement of said foot assembly from a steering control point within the boat.

5. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow drive shaft disposed coaxially with said steering axis and a second drive shaft so disposed as to have its axis pass through the intersection of said steering and tilting axes for providing driving connections between the propeller shaft and the motor in the boat, means including said mounting means for providing a substantially watertight housing for said driving connections, said mounting means including a tubular member secured to the foot assembly and having said hollow drive shaft telescopically mounted therein, an expansible yoke assembly forming a movable portion of said housing means and having a portion of said tubular member telescopically mounted therewith, and means including a first steering shaft extended through said hollow shaft and a second steering shaft universally connected to said first steering shaft at the intersection of said steering and tilting axes for providing control over the steering movement of said foot assembly from a steering control point within the boat.

6. In an outboard propeller drive for an inboard motor boat, the combination of a propeller shaft, a foot assembly for rotatively supporting the propeller shaft, means for mounting the foot assembly on the stern of the boat for steering movement about an axis substantially perpendicular to the propeller shaft, and for tilting movement about a transverse axis, perpendicular to the steering axis, and intersected therewith, means including a hollow drive shaft disposed coaxially with said steering axis and a second drive shaft so disposed as to have its axis pass through the intersection of said steering and tilting axes for providing driving connections between the propeller shaft and the motor in the boat, means including said mounting means for providing a substantially watertight housing for said driving connections, said mounting means including a tubular member secured to the foot assembly and having said hollow drive shaft telescopically mounted therein, an expansible yoke assembly forming a movable portion of said housing means and having a portion of said tubular member telescopically mounted therewith, a collar disposed in telescoping relation to said yoke and tubular members, means including a thrust resisting member adjustable longitudinally of the boat for engaging said collar to limit tilting movement of the foot assembly toward the boat, means engageable by said thrust resisting member for preventing tilting movement of the foot assembly when the same is turned substantially 180 degrees about its steering axis.

BEAUMONT B. WRIGHT.

REFERENCES CITED

The following references are of record in the file of this patent:

UNITED STATES PATENTS

| Number | Name | Date |
|---|---|---|
| 833,218 | Jennings | Oct. 16, 1906 |
| 940,039 | Marble | Nov. 16, 1909 |
| 974,961 | Hall | Nov. 8, 1910 |
| 1,538,802 | Harley | May 19, 1925 |
| 1,980,685 | Johnson | Nov. 13, 1934 |
| 2,116,146 | Gondek | May 3, 1938 |
| 2,337,376 | De Micelis | Dec. 21, 1943 |
| 2,415,183 | Law | Feb. 4, 1947 |

FOREIGN PATENTS

| Number | Country | Date |
|---|---|---|
| 345,150 | Great Britain | Mar. 19, 1931 |
| 364,207 | Great Britain | Jan. 7, 1932 |
| 13,705 | Sweden | Sept. 24, 1901 |